United States Patent [19]

Rovel

[11] Patent Number: 5,348,653

[45] Date of Patent: Sep. 20, 1994

[54] PROCESS FOR THE BIOLOGICAL PURIFICATION OF EFFLUENT

[75] Inventor: Jean-Marie Rovel, Rueil Malmaison, France

[73] Assignee: S.A. Degremont, Rueil Malmaison, France

[21] Appl. No.: 951,012

[22] Filed: Sep. 25, 1992

[30] Foreign Application Priority Data

Oct. 2, 1991 [FR] France .................................. 91 12133

[51] Int. Cl.$^5$ ............................................... C02F 3/30
[52] U.S. Cl. ..................................... 210/605; 210/617; 210/903; 210/921
[58] Field of Search ............... 210/605, 614, 617, 903, 210/921

[56] References Cited

FOREIGN PATENT DOCUMENTS 3215404 10/1983 Fed. Rep. of Germany .
3916679 11/1990 Fed. Rep. of Germany .
3934958 4/1991 Fed. Rep. of Germany .

*Primary Examiner*—Thomas Wyse
*Attorney, Agent, or Firm*—Pollock, Vande Sande & Priddy

[57] ABSTRACT

Process for the biological purification of effluent which makes it possible either to ensure complete treatment of the carbon pollution and the nitrogen pollution at the nominal output, or to remove the biological oxygen demand or BOD only during a substantial increase in the nominal output, especially if it rains, using bacteria in fixed cultures, said process comprising the step of using the modifications of the surrounding environment, that is to say the oxidation-reduction potential which depends on the presence or absence of dissolved oxygen, and the composition of the water in contact with the bacteria, either to modify the enzymatic system of the flora present in the bacterial film of the fixed culture in order to assign to the removal of the BOD a fixed culture which up until then carried out denitrification, or to promote, in the same bacterial film, the development of the most appropriate flora for the desired objective: the removal of the BOD or nitrification.

2 Claims, 1 Drawing Sheet

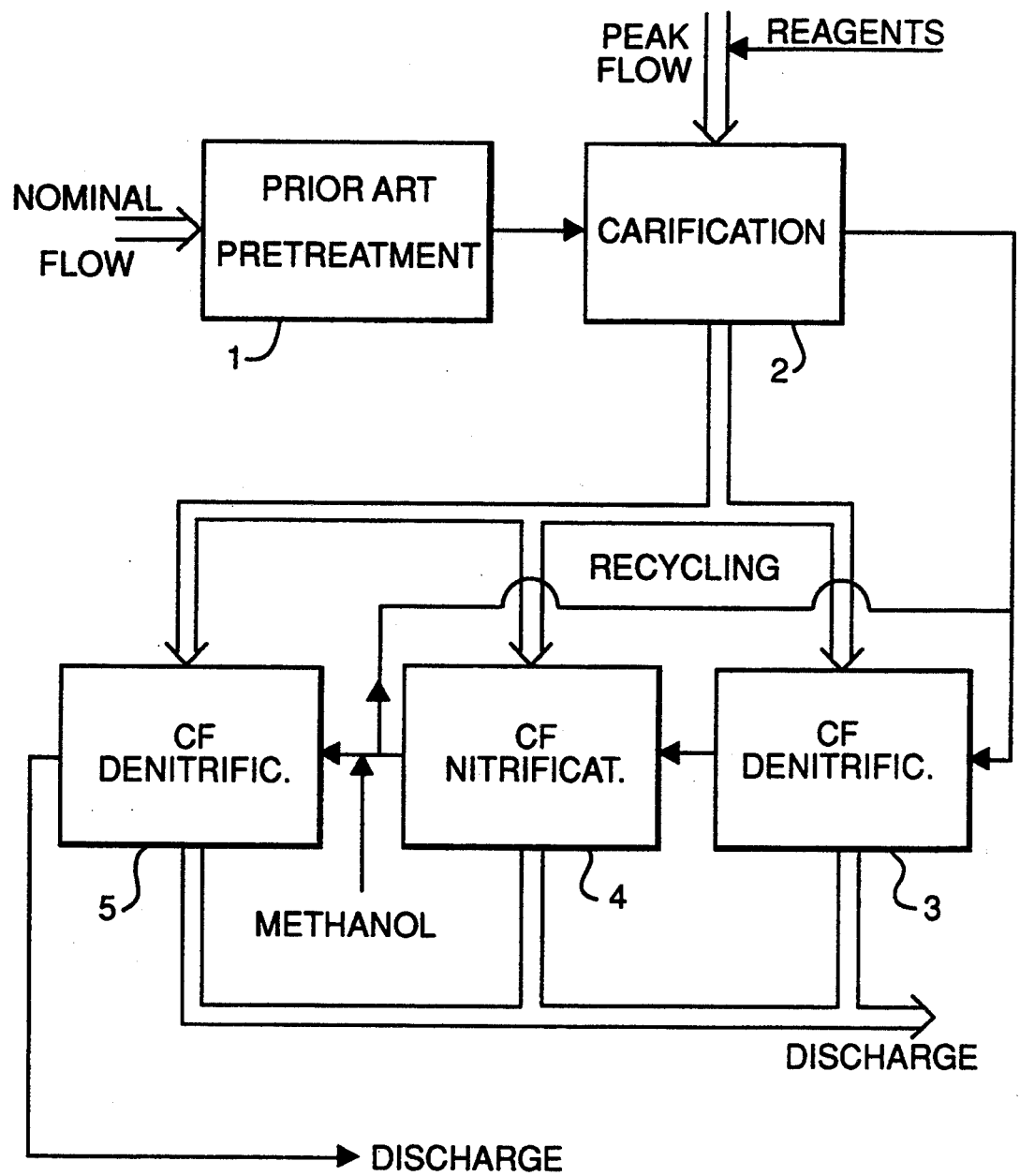

PROCESS FOR THE BIOLOGICAL PURIFICATION OF EFFLUENT

FIELD OF THE INVENTION

The present invention relates to a process and for the biological purification of waste water.

BACKGROUND OF THE INVENTION

As commonly known, the biological purification of waste water essentially relates to the removal of carbon pollution which is characterized overall by its biological oxygen demand or BOD and the removal of nitrogen pollution.

The removal of carbon pollution is performed in the presence of oxygen by so-called heterotrophic bacteria, which use nutritive substances and convert them more simple materials, the energy released being used for the needs of the cells. In a large majority of cases, the organic nitrogen carried with the untreated waste water is converted to ammonia during this operation.

The removal of nitrogen pollution is performed in two stages:
  Nitrification, the oxidation of ammonia to nitrites by bacteria of the Nitrosomonas genus and then to nitrates by bacteria of the Nitrobacter type, both of the autotrophic type;
  Denitrification during which the conversion of nitric nitrogen to gaseous nitrogen is performed by heterotrophic bacteria.
  Nitrification occurs in the presence of oxygen, similar to the removal of carbon pollution as mentioned above, and it involves autotrophic bacteria which themselves synthesize their growth factors whereas denitrification uses heterotrophic bacteria under anoxia, in a medium practically free of dissolved oxygen.

The bacteria may be used in numerous processes which can be grouped into two families:
  processes using free cultures in which the purified bacterial flora is present in a sludge-like suspension called "activated sludge" or
  processes using fixed cultures in which the bacteria become fixed onto a solid support by means of gelatinous material based on exopolymers which they secrete and within which they have a degree of mobility.

Whichever process is chosen, the required conditions for each stage of the purification means that a specific apparatus must be provided for each function, either a single apparatus if a reduction in the biological oxygen demand (BOD) is sufficient, or three apparatuses in series for complete treatment.

Whatever the case, a plant for the biological purification of waste water consists of one or several apparatuses designed to treat a certain flow (called nominal flow) and from the hydraulic and purification point of view, can only tolerate limited increases in this flow (up to +20% approximately) otherwise the purification results and especially the nitrification results will be seriously impaired. In particular, such a plant cannot withstand heavy rain which temporarily increase the flow to a value several times higher than the nominal flow even at the cost of a decrease in purification which might be acceptable insofar as it is itself temporary.

In order to accommodate this increase in flow, it is necessary to use, during rainy periods, overflows called storm-overflows which return to the natural environment, without treatment, the excess flow above the chosen nominal flow, which obviously has disadvantages especially with respect to the preservation of the environment.

BRIEF DESCRIPTION OF THE INVENTION

The objective of the present invention is therefore to overcome these disadvantages by providing a process and an apparatus which is capable either of ensuring complete treatment of carbon pollution and nitrogen pollution at the nominal flow, or of removing the biological oxygen demand only at the storm flow conditions.

Consequently, this invention relates, firstly, to a process for the biological purification of waste water which makes it possible either to ensure complete treatment of carbon pollution and nitrogen pollution at the nominal flow, or to remove the BOD only during a substantial increase above nominal flow, especially if it rains, using bacteria in fixed cultures, characterized in that it modifies the surrounding environment, that is to say the oxidation-reduction potential which depends on the presence absence of dissolved oxygen and/or nitrate, and the composition of the water in contact with the bacteria, either to modify the enzymatic system of the flora present in the bacterial film of the fixed culture which up until then carried out denitrification, in order to utilize it for assign the removal of BOD, or to promote, in the same bacterial film, the development of the most appropriate flora for the desired objective: the removal of the BOD or nitrification.

The process according to the invention is based on the fact that the bacteria which are active during denitrification (that is to say in a fixed culture following removal of the carbon pollution and nitrification) are heterotrophic like the bacteria used for removal of the BOD. Thus, according to the process of the invention, if this fixed culture is supplied, no longer with water from the nitrification step, but directly with untreated water (rain or storm water), while at the same time providing dissolved oxygen, a modification of the enzymatic system of the bacteria results so they consume free oxygen, rather than oxygen which is linked to nitrates. Thus, according to the process of the invention, a fixed culture, which previously carried out denitrification, can be utilized for to the removal of the BOD.

On the other hand, when this fixed culture again follows the nitrification step, creating a shortage of free oxygen, the bacteria are forced to restore their initial enzymatic system (to oxidize the organic matter using oxygen from the nitrates present). The fixed culture can therefore be brought back to its initial denitrification activity.

Moreover, it is known that bacteria which are active in nitrification are autotrophic and therefore cannot be used for the removal of the BOD. On the other hand, it was observed that by supplying such a fixed culture with untreated water, a heterotrophic flora, brought by the untreated water itself, can be rapidly developed above the autotrophic, now inactive flora which it envelopes. By this means, it is possible, according to the invention, to utilize for the removal of the BOD, a fixed culture apparatus which up until then carried out nitrification.

The underlying population of autotrophic bacteria is not destroyed and continues to exist on the support. However, it is possible to remove, by washing, the excess biofilm formed on the fixed culture support, the external layer of this film leaving the first layers firmly fixed onto the material, especially if the latter has a rough and porous surface. In the present case, and according to the invention, washing makes it possible to remove the heterotrophic flora and to make the autotrophic flora reappear, which therefore makes it possible, by returning the bacteria bed back to its initial place in the chain after washing it, to bring it back to its initial nitrification activity.

Secondly, the invention relates to a plant which makes it possible to implement the process specified above. This plant is essentially comprises:

- a pretreatment plant (grit removal, screening and grease removal) supplied with water at the nominal flow;
- a clarification plant designed to operate without the addition of reagents when it is supplied at the nominal flow after passage of the waste water to be treated through a pretreatment plant or and with the addition of reagents when it is directly supplied at the peak flow, that is several times greater than the nominal flow in the case of a storm for example;
- a fixed culture biological treatment plant through which the treated water passes next. This plant comprising biofilters for the removal of the BOD, the denitrification and the nitrification, normally placed in series, means enabling the biofilters to be placed in parallel when the nominal flow is exceeded and with means enabling the air flow rate to be adjusted in order to establish aerobic conditions in the anoxia zones in the event of an increase in the flow and in order to discontinue the aeration of the biofilters in the event of a decrease in the flow during a return to the nominal flow and,
- means for detecting a massive increase in the flow, especially in the event of storms, designed so as to trigger the following operations:
  initiation of the addition of the clarification reagents;
  sequential initiation of all the aerators of the biofilters in order to establish aerobic conditions in the anoxia zones of the biological treatment plant and,
  placing the biofilters in parallel;

these conditions enabling, in addition, a return to the normal operating conditions during a decrease in the flow, returning to its nominal value by triggering the following operations:

replacing the biofilters in series and washing the biofilter utilized for the nitrification and;
  terminating aeration of the biofilters utilized for denitrification.

Thus, the present invention provides means enabling the denitrification and nitrification apparatuses, which are normally placed in series with respect to an apparatus for removing the BOD, to be temporarily utilized for the removal of the BOD. This invention also applies in the case where the denitrification is performed partially upstream by recycling the nitrified water in order to improve the yield, and in the case where—denitrification being performed partially upstream—the number of apparatuses in series is reduced from three to two provided that part of the nitrates can be discharged into the natural environment.

Taking into account the specific conditions for operating each of the purification stages, the volumes of the apparatuses utilized are different and have, in the case of a plant comprising three apparatuses, the following order of magnitude:

removal of the BOD: 1
  nitrification : 2
  denitrification : 1

It can therefore be seen that by using the means of the invention, utilizing all the apparatuses for the removal of the BOD and by no longer placing these apparatuses in series but in parallel, a plant is obtained which has a capacity four times that of the preceding one. This value is given only by way of a nonlimitative example both because the respective volumes of the apparatuses can vary and because their peak flow can exceed the nominal flow which is generally calculated with a margin of safety.

BRIEF DESCRIPTION OF THE FIGURE

The Figure is a block diagram of the present invention.

DETAILED DESCRIPTION OF THE INVENTION

In order to facilitate the understanding of the present invention, an urbane waste water treatment plant comprising a biological treatment according to the invention is described below by way of a nonlimitative example and the results obtained for the corresponding pilot plant are presented. In this description, reference is made to the single Figure of the attached drawing which very schematically represents the plant conforming to the invention.

This plant can be supplied either at the nominal flow through a conventional pretreatment plant (grit removal, screening and grease removal) denoted by the reference 1, or at the peak flow (that is to say especially in the event of a storm). The untreated water is subjected to a preliminary clarification (reference 2). Taking into account the substantial variations in flow, this clarification step is advantageously performed according to the invention in a laminar clarifier of the type marketed by the present patentee under the trade mark "DENSADEG" and which has been the subject of French Patent No. 2,553,082. This clarifier operating at the nominal flow, without the injection of reagents, achieving a 40 to 70% reduction in the level of suspended matter and a 20 to 35% reduction of the BOD, indeed has the advantage of also being able to operate at a flow four to six times higher, with an injection of reagents (for example iron or aluminium salts and a suitable polymer), thereby achieving a 70 to 90% reduction in suspended matter and a 75% reduction in BOD.

The clarified water then passes into a fixed culture biological treatment plant comprising in this case three biofilters designated by the references 3, 4 and 5 respectively, which are preferably of the type marketed by the present patentee under the trade mark "BIOFOR" and which were the subject of French Patent No. 2,580,622. These biofilters comprise an air injection device which offers the possibility of an automatically discontinuing cut off of the aeration without the risk of gradual blocking, by virtue of the cleaning system with which it is provided. These apparatuses are equipped with a bacteria-supporting material, preferably of the type marketed by the present patentee, whose porosity and roughness are particularly well adapted to the washing process used for reactivating the nitrifying bacteria of a biofilter after being temporarily used for removing the BOD.

The operation of this plant conforming to the invention is as follows:

1. At normal flow, represented on the figure by ordinary lines, the three biofilters 3, 4 and 5 are placed in series. The untreated water at the nominal flow passes into the pretreatment plant 1 before being subjected to clarification in 2, without injection of reagents. The untreated water is then delivered to the biofilters 3, 4 and 5 of the biological treatment plant which are placed in series. The water which leaves the nitrification biofilter 4 is partially recycled in an anoxia zone upstream of the plant (as represented in the figure) and the rest is sent to the denitrification biofilter 5 after injection of methanol or any other product which is suitable for providing the denitrifying bacteria of this last biofilter 5 with the supply of carbon they require.

2. In the case of a storm foreboding a massive increase in flow, automatic means provided by the invention (not represented on the drawing) make it possible, from any precise information, for example by radar, rain gauge or system level type and the like, to be warned sufficiently in advance (at least 30 min and preferably 1 h earlier) of the arrival of large flows. These means then trigger the following operations:

initiation of the addition of reagents to the untreated water obtained during these peak flows before their treatment in the clarification plant 2 (this addition takes place proportionally to the flow or preferably to the inlet flux of the suspended matter), and discontinuing of the injection of methanol into the biological treatment plant; (ref 5)

sequential initiation of all the aerators for the biofilters 3, 4 and 5 adjusting them to the maximum air flow rate in order to establish aerobic conditions in the anoxia zones, in the denitrification biofilter 5 and, optionally, in the top denitrification biofilter 2 (if there is denitrification by recycling upstream);

placing the biofilters 3, 4 and 5 in parallel (this situation is represented by double lines on the drawing), starting with two biofilters upstream and then a third, depending on the increase in flow. In the event of a medium flow, the nitrification biofilter 4 can be kept in series so as to ensure partial nitrification.

3. During a decrease in flow, which is detected by the means provided for this purpose by the invention, the following operations are performed successively:

replacing biofilters 3, 4 and 5 in series and washing biofilter 4 which is utilized for nitrification;

discontinuing the aeration of the third biofilter 5 as soon as nitrates appear and reinitiating the injection of methanol depending on the amount of nitrates measured at the outlet of the second biofilter 4 and reintroduction of the recycling of the water leaving the nitrification biofilter 4, at the inlet of the top of biofilter 3 and cutting off the aeration of the latter.

Thus, the plant is brought back to its operating conditions at the normal capacity described above.

The results which were obtained from the pilot plant produced in conformity with the present invention are given below.

The trials using this pilot were performed at the following flows:

4 m$^3$/h corresponding to dry weather;

23 m$^3$/h corresponding to stormy weather, in a biological treatment chain comprising three biofilters in series in the first case, and in parallel in the second. The volumes of these biofilters were respectively as follows (in the order of the biofilters operating in series): 3 m$^3$; 4.8 m$^3$ and 1.8 m$^3$.

The water to be treated, representative of the Paris area, had the following characteristics:

|  |  | Dry weather | Stormy weather |
|---|---|---|---|
| Suspended matter (SM) | mg/l | 220/250 | 200 |
| BOD | " | 175/200 | 160 |
| Nitrogen, NTK (organic + ammoniacal) | " | 35/45 | 20/25 |

After treatment, the following results were obtained:

| Suspended matter | mg/l | 4/10 | 10/20 |
|---|---|---|---|
| BOD | " | 3/10 | 15/27 |
| Nitrogen, NTK | " | 1/3 | — |
| Total nitrogen | " | 2/5 | — |

The above mentioned results, which were measured on average samples corresponding to two hours of operation, show that purified water can be obtained:

which meets the French standard eNGL2, or the European standard "large station in a sensitive zone" at the nominal flow in normal weather;

which meets the French standard e in stormy weather; knowing that these standards correspond to:

standard e : BOD<30 SM<30 standard eNGL2 : total nitrogen<20

The results also made it possible to observe that on returning to normal conditions after a storm, nitrification is reestablished at 80% four hours after washing the biofilter 4 assigned to the nitrification and replacing the biofilters in series, and that the European standard is achieved in less than eight hours.

The present invention is not limited to the examples of implementation or application described and mentioned herein, but encompasses all the variants.

I claim:

1. A process for biological treatment of waste water, comprising the steps:

normally subjecting the waste water to serially connected biofilters for producing sequential fixed culture anoxic denitrification, oxic nitrification, and anoxic denitrification which removes carbon and nitrogen pollution from the waste water, the biofilters each containing fixed cultures having autotrophic and heterotrophic flora;

detecting a substantial increase of waste water flow;

subsequently subjecting parallel flows of waste water to the biofilters, instead of serially when said increased flow is detected;

subjecting the denitrification biofilters to a supply of air for combining oxygen in the air with carbon in the waste water to perpetuate heterotrophic flora in the biofilters, and consequently reducing biochemical oxygen demand;

detecting return of normal flow rates of the waste water;

subsequently subjecting the waste water to the biofilters connected once again in series when normal flow rate is detected;

discontinuing the air supply to the denitrification biofilters; and washing the nitrification biofilter to remove heterotrophic flora, allowing return of initial autotrophic flora levels, thus restoring sequential nitrification.

2. The process set forth in claim 1 together with pretreatment steps, comprising:

the removal of grit and grease from the waste water;
mechanical clarification of the waste water; and
the controlled addition of reagents to the clarification during a change of state of the waste water.

* * * * *